Dec. 13, 1949　　　　R. MAYNE ET AL　　　　2,490,976
METHOD OF MAKING AIRFOILS, HELICOPTER BLADES,
LEADING EDGES, AND THE LIKE
Filed Nov. 26, 1946　　　　　　　　　　3 Sheets-Sheet 1

Inventors
Robert Mayne &
Harry L. Hosterman, Jr.

By A. H. Oldham
Attorney

Dec. 13, 1949 R. MAYNE ET AL 2,490,976
METHOD OF MAKING AIRFOILS, HELICOPTER BLADES,
LEADING EDGES, AND THE LIKE
Filed Nov. 26, 1946 3 Sheets-Sheet 2

Inventor
Robert Mayne &
Harry L. Hosterman, Jr.

By H. H. Oldham
Attorney

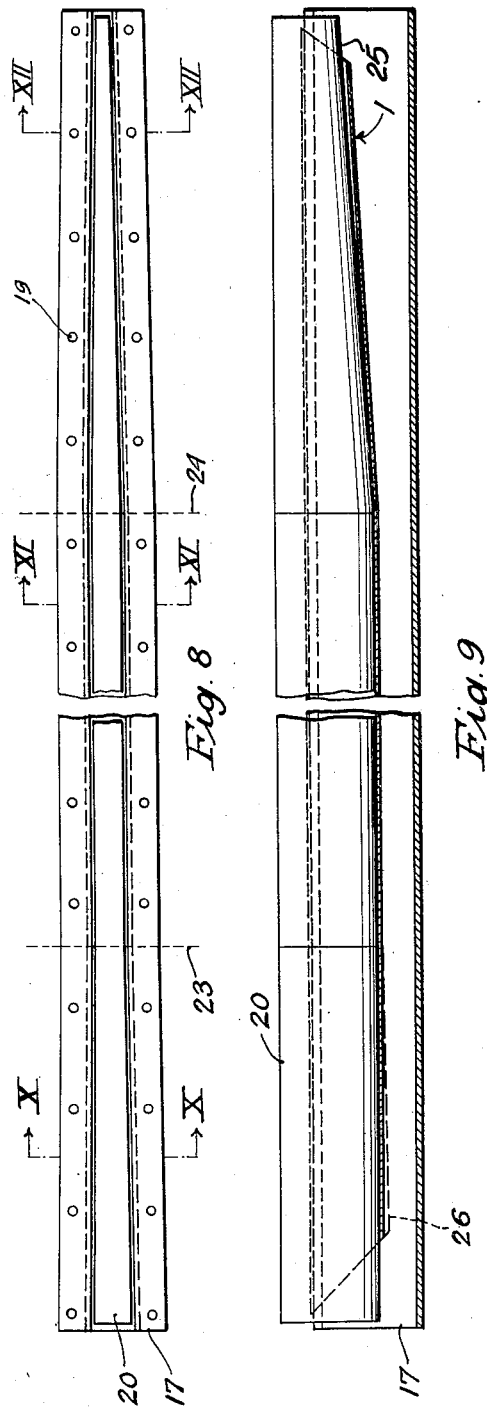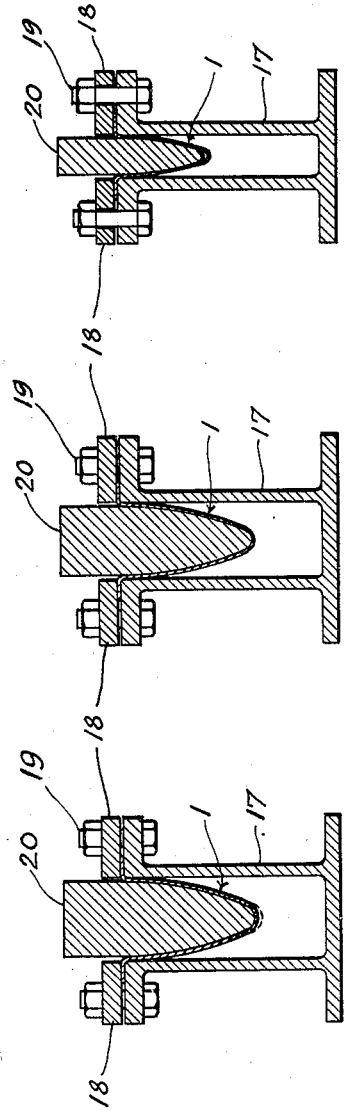

Patented Dec. 13, 1949

2,490,976

UNITED STATES PATENT OFFICE 2,490,976

METHOD OF MAKING AIRFOILS, HELICOPTER BLADES, LEADING EDGES, AND THE LIKE

Robert Mayne, Akron, and Harry L. Hosterman, Jr., Atwater, Ohio, assignors to Goodyear Aircraft Corporation, Akron, Ohio, a corporation of Delaware Application November 26, 1946, Serial No. 712,338

8 Claims. (Cl. 29—156.8)

This invention relates to methods for making airfoils, and, more particularly, is concerned with methods for making leading edges for airfoils, and, specifically, leading edges for helicopter blades.

It is well understood that structural requirements for airfoils are relatively high, entailing characteristics of light weight, high strength, and long life. Engineering and structural requirements for rotary airfoils, for example, of the type used in helicopters, are still higher. This is because the rotary airfoils are subjected to centrifugal forces, and to load, torque, vibration, and bending forces of highly complex character, occasioned by the rotary motion of the airfoils during the forward movement of the helicopter. Moreover, often the rotary airfoil, as typified in the helicopter blade, is designed for aerodynamic and other purposes to have other than a straight line along its leading edge. All of these factors are known to render the building of a quality rotary airfoil of fully satisfactory character a complicated and difficult problem.

It is the general object of the invention to avoid and overcome the foregoing and other problems and difficulties by the provision of an improved, practical, simplified, and relatively easily performed method for making an airfoil, and, specifically, the leading edge for a helicopter blade.

Another object of the invention is to provide an improved method for forming sheet metal having high strength characteristics, such as stainless steel, into products, such as the leading edge of an airfoil.

Another object of the invention is to provide improved methods of the character heretofore described, and wherein stress concentrations or other damage to the sheet metal is avoided by eliminating concentration of gripping pressure of frictional resistance in the sheet metal forming operations.

The foregoing objects of our invention, and other objects which will become apparent as the description proceeds, are achieved by the provision of a method which may include, as an example, the steps of providing a flat blank of sheet metal of long and narrow rectangular shape, notching the ends of the blank, bending the blank longitudinally into a U-shape in cross-section, applying a longitudinal stress below the elastic limit to the blank, permanently bending the blank adjacent the one end in a convex direction, and adjacent the opposite end in a concave direction, trimming the ends of the blank from the bottom of the U outwardly at an angle so that the bottom of the blank is shorter in longitudinal length than the edges, holding the edges on substantially straight lines while stretching the blank beyond its elastic limit in a direction substantially perpendicular to the bottom of the blank, trimming the edges of the blank substantially to the straight lines on which it was held, and cutting the ends of the blank off so that they are substantially normal to the bottom of the blank.

For a better understanding of our invention reference should be had to the accompanying drawings, wherein:

Fig. 8 is a plan view of the supporting channel and forming bar of the apparatus of Fig. 7;

Fig. 9 is a side elevation of the apparatus of Fig. 8 but with one side of the supporting channel removed;

Figure 13:
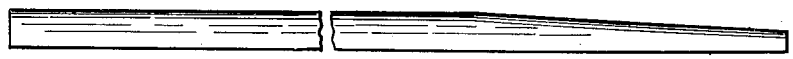

Figs. 10, 11, and 12 are transverse vertical sections on a larger scale taken, respectively, substantially on lines X—X, XI—XI, and XII—XII, of Fig. 8; and Fig. 13 is a plan view of the trimmed and finished leading edge, with the curved edge uppermost.

Figure 3:
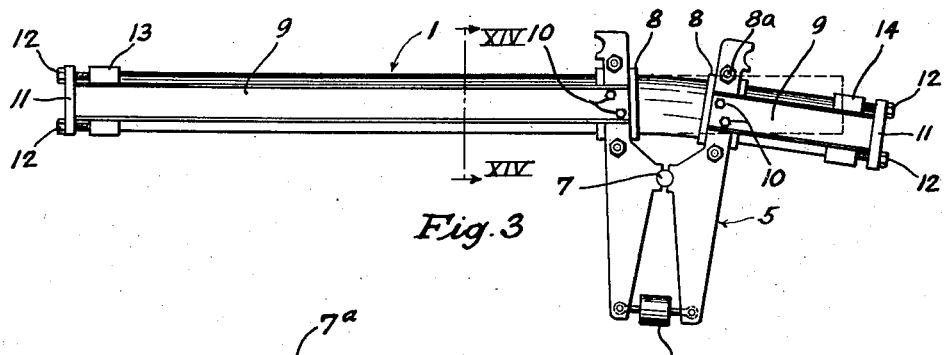
Fig. 3 is a plan view, somewhat in diagrammatic form, illustrating the apparatus for tensioning the blank from end to end and for bending the blank convexly.
Figure 14:
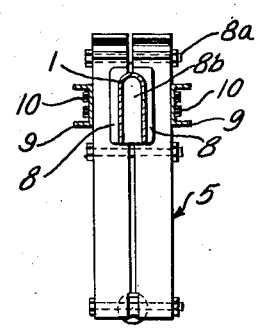

Fig. 14 is a cross-sectional view taken on line XIV—XIV of Fig. 3.

In the drawings, the numeral 1 indicates generally a metal blank of rather narrow, rectangular, elongate character, and made of stainless steel sheet. This is the type of blank which is employed in the manufacture of a leading edge for a helicopter blade, but it is to be particularly understood that while the invention has been illustrated and will be described in conjunction with the manufacture of a leading edge for a helicopter blade, none the less, the principles of the invention may be used in the manufacture of a wide variety of items, including airfoils of all types, and that various material in sheet or other form other than stainless steel may be operated upon by the method herein described.

The blank 1 is formed with holes 2 near the center of the ends of the blank, and slits 3 extend from the holes to the ends of the blank. The effect of the holes 2 and the slits 3 is to form notches in the ends of the blank which shorten the effective length of the center of the blank, all for reasons to be hereinafter described.

Figure 1:
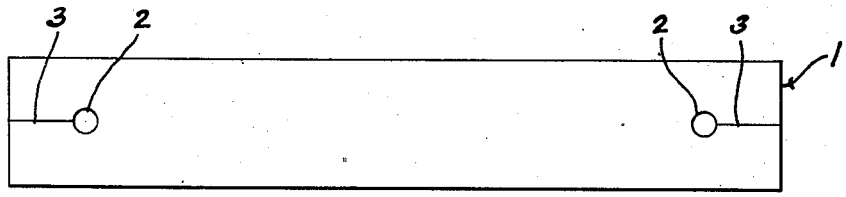
Fig. 1 is a plan view of a typical sheet metal or other blank to be operated upon in accord with the method of the invention.
Figure 2:
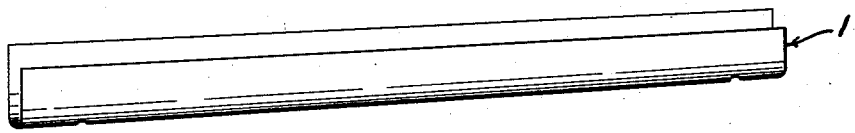
Fig. 2 is a perspective view of the blank of Fig. 1 formed into a U-shape in cross section.

The blank of Fig. 1 is first formed into a channel of U-shape in cross-section, substantially as shown in Fig. 2. In the manufacture of a leading edge for a helicopter blade it has been found advantageous to form both concave and convex bends on the leading edge, and this is ordinarily a very difficult thing to do, particularly in stainless steel which has a very high strength. The concave and convex bends in the blank 1 are achieved in a novel way which will now be described.

A suitable apparatus is provided, as shown in Fig. 3, which includes a pair of heavy members, indicated as a whole by the numeral 5, and which can best be described as a pair of pliers. One end of the pliers 5 is connected together by a pressure cylinder 6 which is adapted to move the ends of the pliers together or apart. In Fig. 3 the pliers have a pivot 7, and a pair of jaws 8, the jaws having two portions which clamp tightly under the action of bolts 8$^a$ against the blank 1, suitable filler blocks 8$^b$ being positioned inside of the blank and cooperating with the jaws to achieve a tight gripping action between the jaws and the surface of the blank. Each one of the beam members of the pliers 5 has associated with its top and bottom surfaces elongated channels 9, secured in place by means of stud bolts 10. The ends of the channels 9 remote from the pliers 5 are connected together by end plates 11, and the end plates 11 carry bolts 12 which are freely rotatable in the end plates 11 and are screwed into tapped holes in the jaws 13 and 14 respectively, which clamp on the ends of the blank 1.

Thus, in accord with the method, the apparatus of Fig. 3 is set up to receive the channel shaped blank 1, the ends of the blank are gripped by the jaws 13 and 14, and tension is applied longitudinally to the blank 1 by tightening the bolts 12 to draw the jaws 13 and 14 apart to thereby place a relatively high longitudinal tension upon the blank. This tension never exceeds the elastic limit of the material of the blank, but ordinarily is within ten to twenty per cent of the elastic limit. Thereafter, the jaws 8 of the pliers 5 are tightened in place upon the blank on each side of the area wherein it is wished to form a convex bend on the leading edge of the blank. Now with the jaws of the pliers 5 positioned together, and when the blank 1 is still straight, as indicated by the dotted line at the right hand side of Fig. 3, the pressure cylinder 6 is energized to move the jaws 8 of the pliers apart to bend the blank to the solid line position shown in Fig. 3.

It will be recognized that the pressure of the jaws 8 upon the blank need only be great enough to grip the blank to apply a stress thereto through the final 10% or 20% of the elastic limit, at which time the yield point of the material of the blank is reached, and the blank is permanently bent in the manner shown in Fig. 3. This means that there is no concentration of gripping force, or no sliding of the jaws 8 on the blank in the region of the bend.

Figure 4:
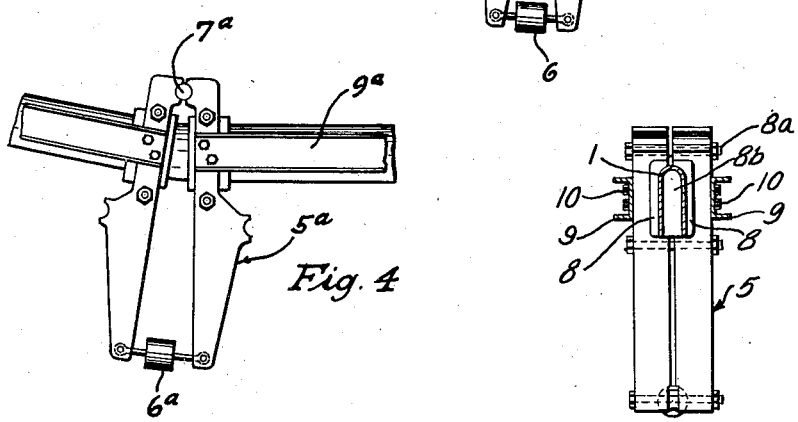
Fig. 4 is a view similar to Fig. 3 but with parts of the apparatus broken away, and illustrating the bending of the blank concavely.

In Fig. 4, in order to make a concave bend on the blank at its leading edge, the pliers are taken apart and repositioned so that the pivot point 7, marked 7$^a$ in this case, is at one end of the pliers 5$^a$, each beam of the pliers having been turned over. The channels 9$^a$, and the other parts of the apparatus of Fig. 3 are employed in exactly the same fashion, except that in Fig. 4 the pressure cylinder 6$^a$ is energized to move the ends of the pliers apart to thereby achieve a concave bending of the blank at its leading edge.

Figure 5:
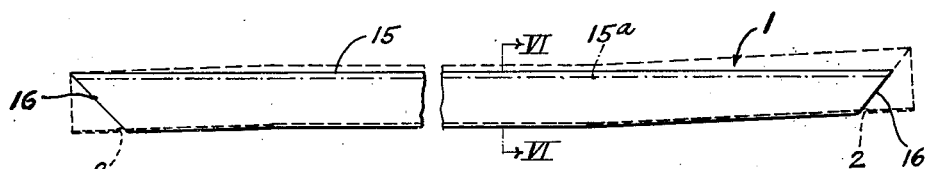
Fig. 5 illustrates the blank after the operations preformed in Figs. 3 and 4 after trimming.
Figure 6:
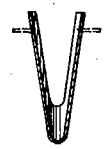
Fig. 6 is a vertical cross sectional view of the blank as taken on line VI—VI of Fig. 5.

After the blank 1 is bent convexly and concavely in the manner shown in Figs. 3 and 4, the blank then has substantially the appearance shown in dotted lines in Fig. 5. The solid lines of Fig. 5 indicate the shape of the blank after it has been trimmed. The longitudinal edges of the blank are trimmed on a substantially straight line 15, and the ends of the blanks are trimmed at angles 16 which extend substantially from the holes 2 to the corners of the legs of the blank. The dot and dash line 15$^a$ indicates the line on which the sides of the blank are bent at right angles to provide the holding flanges utilized in the process steps to be hereinafter described. Fig. 6 shows the holding flanges in dotted lines.

Figure 7:
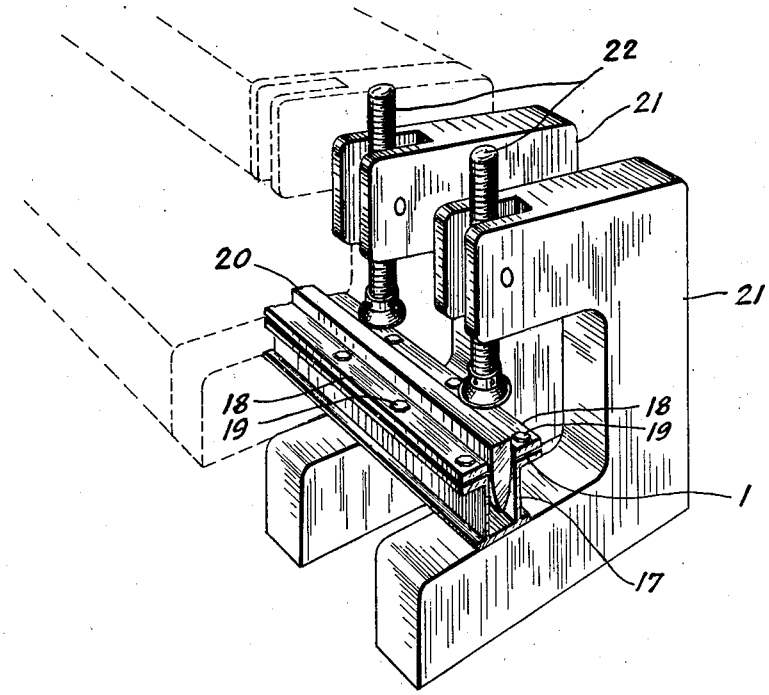
Fig. 7 is a perspective view of a typical apparatus utilized in our improved method to give a final forming operation to the blank.

It is ordinarily necessary to give a final shaping operation to the blank, and this is achieved with the apparatus and in the manner illustrated in Fig. 7. Specifically, a relatively deep U-shaped channel 17 is adapted to receive the blank 1, with the upper edges of the blank being folded over upon the horizontally flanged upper ends of the channel 17, and with clamping bars 18, held in place by screws 19, being utilized to clamp the bars against the bent over edges or flanges of the blank 1. A forming bar 20, having a streamlined or airfoil shape in cross section, extends the full length of the blank. In order to force the forming bar 20 down into the blank, any suitable pressure means may be ultized. One convenient manner of achieving the desired pressure is to provide a plurality of C-shaped clamping frames 21, having a lower leg portion upon which the channel 17 rests, and an upper leg portion which rotatably supports a heavy screw 22 which is adapted to be turned down into engagement with the forming bar 20. In this manner by positioning a plurality of clamping frames 21 and pressure screws 22 along the length of the forming bar 20, the forming bar may be forced under very high pressure down into the blank 1 to give a final shaping to the blank. It will be understood that the screws 22 are turned down by having an operator turn the first screw a half a turn or so and then going on to the next screw and so on down the whole line of the screws, with the operator then beginning at the first screw and repeating the process until the desired forming of the blank beyond its elastic limits has been achieved.

An important feature of this forming operation is that the blank 1, after being trimmed in the manner shown in Fig. 5, has a shorter length adjacent the bottom of the U than at the edges. This is important for the reason that the frictional resistance between the various parts of the blank and the forming bar is rendered more uniform, and the blank is thereby more uniformly stretched. If the blank 1 were of the same length both at its top and bottom, then the frictional resistance of the forming bar 20 and the blank at the bottom of the blank would be a great deal higher than between the blank and the forming bar up at the side or edges of the blank. The result would be a greater stretching of the sides or edges of the blank, than at the bottom of the U of the blank. By making the blank longer at its edges, more metal at the edges of the blank is present to resist stretching of the upper edges of the blank, and a greater amount of stretch is imparted to the bottom of the blank whose strength has been reduced by reducing the longitudinal length of the bottom of the blank. Of course, the relative lengths of the bottom and of the edges of the blank may be different than those shown in the drawing in order to achieve the type of stretching action described or desired.

A second important feature of the forming operation heretofore described is the manner in which the forming bar 20 and the blank 1 are coordinated to obtain substantially uniform unit stretching of each portion of the blank. More particularly, it will be recognized from Figs. 8 to 12 that the forming bar 20, which effects the final forming operation on the blank, has its greatest thickness at the root end from which it tapers in thickness to the end of the root spar, indicated by the line 23, between the lines 23 and 24 the bar is of uniform thickness, and from the line 24 to the tip of the bar it again tapers to reduced thickness. Furthermore, the front or lower edge 25 of the bar from the line 24 to the tip is slanted or doglegged as shown.

The final shape of the blank, as determined by the shape of the forming bar, thus makes it a noteworthy feature of the invention to provide the convex bend in the blank adjacent the line 24 of the forming bar and the concave bend in the blank adjacent the line 23 of the bar. This is because the blank is thereby preliminarily shaped to the shape of the forming bar so that when the bar is forced down into the blank in the manner of Figs. 7, 8, and 9, substantially every portion along the length of the bar begins to bottom simultaneously in the blank and every portion along the length of the blank is stretched per unit substantially uniformly.

More particularly, as will be seen from Fig. 10, the concave bend in the blank adjacent the line 23 causes the left hand end of the blank, as shown in Fig. 9, to be initially positioned at the downwardly extending angle indicated by dotted line 26. However, the forming bar 20 is thickest at the root or left hand end and tapers in thickness to the line 23. This means that the extra material in the blank in the direction of movement of the forming bar 20 moves laterally to compensate for the greater thickness of the root end of the forming bar as the forming bar is pushed into the blank. The result is that the line 26 moves progressively upwards until at the time the bar is bottoming in the blank the line 26 is in line with the bottom of the blank between the lines 23 and 24.

Fig. 11 shows how the forming bar is bottoming simultaneously in the blank between the lines 23 and 24, and Figs. 9 and 12 illustrate the clearance gradually increasing from zero to a maximum between the bottom of the tapered end of the forming bar and the blank when the horizontal portion of the bar bottoms the blank without pre-stretching it. This clearance is provided to prevent over-stretching of the narrower blank width and is greatest at its narrowest width. When stretching of the large blank width commences, stretching of the narrower widths will gradually take place as the clearance will disappear. Then uniform stretching along the full length of the blank will continue to a desired amount beyond the elastic limit of the material.

After the blank has been given the final forming operation by the apparatus of Fig. 7, and in accord with the method just described, the ends of the blank are trimmed off to positions substantially normal to the trailing edges of the blank, and the bent over flanges at the edges of the blank are likewise trimmed off, and the blank is adapted to be incorporated into the leading edge of a helicopter blade.

In Fig. 13 of the drawings, there has been illustrated the finishing leading edge as finally formed and trimmed.

From the foregoing it will be recognized that the various objects of the invention have been achieved by the provision of a relatively simple, rapid, inexpensive, and practical method for making airfoils, leading edges for airfoils, and the like. Particularly, the method is adapted for the handling of a very high strength sheet metal, such as stainless steel, and in forming convex or concave bends longitudinally of channel shaped sheet metal members, and in forming channel shaped members to desired cross sectional contours.

While in accord with the patent statutes one particular embodiment of the invention has been illustrated and described in detail, it is to be particularly understood that the invention is not to be limited thereto or thereby, but that the scope of the invention is defined in the appended claims.

What is claimed is:

1. That method of making the leading edge of a helicopter blade, or the like, which includes the steps of providing a flat blank of sheet metal of long and narrow substantially rectangular shape, bending the blank longitudinally into a U-shape in cross-section, applying a longitudinal tensile stress approaching the elastic limit to the blank, applying additional longitudinal tensile stress to portions of the blank to stress these portions beyond their elastic limit to permanently bend said portions adjacent the tip and convexly with respect to the leading edge and adjacent the root end concavely with respect to the leading edge, trimming the ends of the blank at an angle so that the bottom of the U-shaped section is shorter in longitudinal length than the edges, holding the edges on substantially straight lines while stretching the blank beyond its elastic limit in a direction substantially perpendicular to the bottom of the U-shaped section, and trimming the longitudinal edges of the blank substantially to the straight lines on which it was held.

2. That method of making the leading edge of a helicopter blade, or the like, which includes the steps of providing a flat blank of sheet metal of long and narrow shape, bending the blank longitudinally into a U-shape in cross-section, applying a longitudinal tensile stress near but below the elastic limit to the blank, applying additional longitudinal tensile stress to portions of the blank to stress these portions beyond their elastic limit to permanently bend said portions adjacent the tip and convexly with respect to the leading edge and adjacent the root end concavely with respect to the leading edge, holding the longitudinal edges of the blank while stretching it beyond its elastic limit in a direction substantially perpendicular to the bottom of the U-shaped section, and trimming the edges of the blank.

3. That method of making a leading edge for a helicopter blade or the like which includes the steps of providing an elongate blank of sheet metal, the blank having substantially a U-shape in cross section, applying a longitudinal tension to the blank to tension it strongly but to a point below its elastic limit, gripping the blank at closely spaced areas and applying additional tensile stress to the blank only in the region between where it is gripped to increase the tensile stress beyond the elastic limit and to simultaneously permanently bend the blank in the plane of the legs of the U.

4. That method of making an airfoil or the like which includes the steps of providing an elongate blank of sheet metal having substantially a U-shape in cross section, trimming the ends of the blank at an angle so that the blank is shorter at the bottom of the U than at the upper ends of the legs of the U, gripping the upper ends of the legs of the U, applying force to the bottom area of the U to stretch the blank beyond its elastic limit, and trimming the ends of the blank substantially normal to the bottom of the blank.

5. That method of forming sheet metal and the like which includes the steps of notching the ends of an elongate blank, bending the blank substantially along its center to have the notches connected by the bend, gripping the edges of the blank, and applying pressure to the bottom of the bend to stretch the blank beyond its elastic limit, the pressure being applied to an area having a materially shorter length than the length of the gripped edges.

6. That method of making the forward skin of a helicopter blade or the like, which includes the steps of forming a bar having substantially the shape of the inside of the skin, said bar having a substantially uniform thickness along its middle, a gradually reducing thickness at its tip end, and a gradually increasing thickness at its root end, bending a metal blank into a channel, bending the channel towards the bar at its tip end, bending the channel away from the bar at its root end, the amount of bending of the channel being such that the bar will stretch every part of the channel substantially uniformly when the bar is moved into the channel, and forcibly moving the bar into the channel to permanently stretch the channel.

7. That method of forming sheet metal which includes the steps of providing a die in the form of a bar, said bar having a uniform thickness along one portion and a gradual change in shape along another portion, permanently bending a piece of sheet metal into a channel, permanently bending the channel adjacent the point of joinder of the portions of the bar so that when the bar is moved into the channel the bar will begin to engage and stretch every part of the channel substantially uniformly, and forcibly moving the bar into the channel to permanently stretch the channel.

8. That method of making a leading edge for a helicopter blade, or the like, which includes the steps of providing an elongate blank of sheet stainless steel, the blank having substantially a U-shape in cross section; gripping the blank at the ends, applying longitudinal tension to the blank to tension it strongly but to a point below its elastic limit, gripping the blank at two longitudinally closely spaced areas, the space between said areas defining a blank portion to be bent, and applying only to this portion additional tensile stress beyond the elastic limit to permanently bend the blank concavely with respect to the leading edge and in the plane of the legs of the U, gripping the blank at two closely spaced areas leaving therebetween a portion to be bent farther along the blank, applying additional tensile stress only to this portion to permanently bend the blank convexly with respect to the leading edge and in the plane of the legs of the U.

ROBERT MAYNE.
HARRY L. HOSTERMAN, Jr.

REFERENCES CITED

The following references are of record in the file of this patent:

UNITED STATES PATENTS

| Number | Name | Date |
| --- | --- | --- |
| 1,761,887 | Junkers | June 3, 1930 |
| 1,761,888 | Junkers | June 3, 1930 |
| 1,816,594 | Ledwinka | July 28, 1931 |
| 2,163,531 | Wettstein | June 20, 1939 |
| 2,301,960 | Lermont | Nov. 17, 1942 |
| 2,326,470 | Lermont | Aug. 10, 1943 |

OTHER REFERENCES

The Mag. Mach., pub. July 1944, pp. 147–155.